(12) United States Patent
Nada

(10) Patent No.: US 8,936,007 B2
(45) Date of Patent: Jan. 20, 2015

(54) FUEL INJECTION CONTROL APPARATUS OF INTERNAL COMBUSTION ENGINE

(75) Inventor: Mitsuhiro Nada, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 391 days.

(21) Appl. No.: 13/496,460

(22) PCT Filed: Mar. 30, 2011

(86) PCT No.: PCT/JP2011/058086
§ 371 (c)(1), (2), (4) Date: Mar. 15, 2012

(87) PCT Pub. No.: WO2012/131949
PCT Pub. Date: Oct. 4, 2012

(65) Prior Publication Data
US 2012/0253640 A1  Oct. 4, 2012

(51) Int. Cl.
*F02B 3/00* (2006.01)
*F02M 7/28* (2006.01)
*F02D 41/40* (2006.01)
*F02D 41/18* (2006.01)
(Continued)

(52) U.S. Cl.
CPC .............. *F02D 41/403* (2013.01); *Y02T 10/44* (2013.01); *F02D 41/182* (2013.01); *F02D 41/405* (2013.01); *F02D 35/026* (2013.01); *F02D 2041/389* (2013.01); *F02D 2200/0414* (2013.01)
USPC ............. 123/435; 123/299; 701/103; 701/105

(58) Field of Classification Search
CPC .......................... F02D 41/402; F02D 2200/021
USPC ........... 123/299, 300, 305, 435; 701/103–105
See application file for complete search history.

(56) References Cited

U.S. PATENT DOCUMENTS

| 7,270,118 B2 * | 9/2007 | Yamaoka et al. ............. 123/672 |
| 8,670,918 B2 * | 3/2014 | Morinaga et al. ............. 701/108 |
| 2012/0016571 A1 * | 1/2012 | Nada ............................ 701/104 |

FOREIGN PATENT DOCUMENTS

| JP | 2001-193526 A | 7/2001 |
| JP | 2002-047976 A | 2/2002 |

(Continued)

OTHER PUBLICATIONS

International Search Report of PCT/JP2011/058086 mailed May 10 201 & Written Opinion and translation of Article 34 Amendment.

*Primary Examiner* — Hai Huynh
(74) *Attorney, Agent, or Firm* — Kenyon & Kenyon LLP

(57) ABSTRACT

In a compression self-igniting internal combustion engine, a fuel injection by an auxiliary injection ends before a gas temperature inside a cylinder reaches a temperature at which a fuel starts a low-temperature oxidation reaction. Specifically, an in-cylinder gas temperature (750K) is used as a reference, and the auxiliary injection is carried out before the in-cylinder gas temperature reaches 750K, so as to separate the low-temperature oxidation reaction and a high-temperature oxidation reaction from one another. This control makes a premixed combustion slow before a compression top dead center is reached, and ensures control of the premixed combustion in a temperature controlled manner in accordance with the transition of the in-cylinder gas temperature. This ensures unambiguous determination of the injection time of the auxiliary injection based on the in-cylinder temperature, and facilitates the attempt to simplify the fuel injection control.

5 Claims, 10 Drawing Sheets

(51) Int. Cl.
*F02D 35/02* (2006.01)
*F02D 41/38* (2006.01)

(56) References Cited

FOREIGN PATENT DOCUMENTS

| JP | 2004-003415 A | 1/2004 |
|---|---|---|
| JP | 2004-156519 A | 6/2004 |
| JP | 2004-176593 A | 6/2004 |
| JP | 2004-316557 A | 11/2004 |
| JP | 2004-352344 A | 12/2004 |
| JP | 2005-273513 A | 10/2005 |
| JP | 2007-120353 A | 5/2007 |
| WO | 2010/122643 A1 | 10/2010 |

\* cited by examiner

FUEL INJECTION CONTROL APPARATUS OF INTERNAL COMBUSTION ENGINE

This is a 371 national phase application of PCT/JP2011/058086 filed 30 Mar. 2011, the content of which is incorporated herein by reference.

FIELD OF THE INVENTION

The present invention relates to a fuel injection control apparatus of an internal combustion engine typified by a diesel engine.

BACKGROUND OF THE INVENTION

In diesel engines used as automobile engines or the like, it is common practice to control the form of combustion, which takes place in a combustion chamber (in a cylinder), by adjusting the timing of fuel injection or the amount of fuel injection from a fuel injection valve (hereinafter also referred to as an injector) according to engine revolution, amount of accelerator operation, coolant temperature, intake air temperature, and the like.

Diesel engine combustion, as disclosed in patent document 1 below, is mainly includes premixed combustion and diffusion combustion. When fuel injection starts from the injector into the combustion chamber, the fuel is first vaporized and diffused to generate a combustible mixture (ignition delay period). Next, the combustible mixture ignites by itself approximately simultaneously at several positions in the combustion chamber; thus the combustion rapidly progresses (premixed combustion). The fuel injection into the combustion chamber continues so as to continue the combustion (diffusion combustion). Since unburned fuel exists even after the fuel injection ends, heating continues for some period of time (afterburning period).

In some engines, such as diesel engines, that involve lean combustion, a dominating part of the entire operating area is dedicated to combustion of mixtures of high air-fuel ratios (lean atmospheres). This raises a concern over relatively large amounts of nitrogen oxide (hereinafter referred to as NOx) emissions. Additionally, if a combustion of a mixture in the combustion chamber results in an incomplete combustion, smoke occurs in the exhaust gas, to the further detriment of exhaust emissions.

To reduce the amount of NOx generation, exhaust gas recirculation apparatuses (EGR: Exhaust Gas Recirculation) are known to recirculate part of the exhaust gas back into the intake path (see, for example, patent document 2). Also to improve exhaust emissions, it is known practice to carry out an auxiliary injection in the compression process of the engine so as to cause a premixed combustion using the auxiliary injection (see, for example, patent document 3 and patent document 4).

RELATED ART DOCUMENTS

Patent Documents

Patent document 1: Japanese Unexamined Patent Application Publication No. 2004-156519A.
Patent document 2: Japanese Unexamined Patent Application Publication No. 2004-3415.
Patent document 3: Japanese Unexamined Patent Application Publication No. 2000-352344.
Patent document 4: Japanese Unexamined Patent Application Publication No. 2001-193526.

SUMMARY OF THE INVENTION

Problems to be Solved by the Invention

Incidentally, fuel injection control in conventional diesel engines still remains unspecified as to which state quantity (a physical quantity with which a combustion is unambiguously determinable) to use as a basis on which to simultaneously meet the various requirements such as reducing the amount of NOx generation, reducing the amount of smoke generation, reducing combustion noise in the combustion process, and ensuring stability of combustion.

For this reason, the current practice is a trial-and-error approach that includes, for each kind of engines, applying an appropriate fuel injection form (which includes fuel injection amount and injection time) to each of operating states such as engine revolution and required torque (that is, to each lattice point of an operating state map with the engine revolution and the required torque as parameters). (That is, a fuel injection pattern suitable for each kind of engines is applied.)

For example, in order to obtain stable preheating by an auxiliary injection, it is necessary in the compression process to raise the in-cylinder gas temperature to 900K (which is the start temperature of a high-temperature oxidation reaction) before the compression top dead center (TDC) is reached. Unfortunately, in some engine operating states such as when the temperature is low and when the pressure is low, it is occasionally difficult to achieve the foregoing (to achieve BTDC900K) only by increasing the temperature by gas compression. In this case, the fuel injection amount for the auxiliary injection is increased so as to increase the rising speed of the in-cylinder gas temperature. However, there is no established, systematic fuel injection control method for specifying when to set the injection time of the auxiliary injection.

Even when 900K is achieved before the compression top dead center is reached, it may be necessary in some cases to increase the fuel injection amount for the auxiliary injection at a request associated with the premixed combustion amount (for example, at a request to increase the premixed combustion amount, which is due to priority placed on emission). In such cases, there is currently no established, systematic fuel injection control method for specifying when to set the injection time of the auxiliary injection.

Thus, the conventional trial-and-error approach to determine the fuel injection form (which includes fuel injection amount and injection time) has caused complication in application, and there has been no established, systematic fuel injection control method that is common to various kinds of engines.

The present invention has been achieved in view of the above circumstances, and it is an object of the present invention is to provide systematic fuel injection control to achieve appropriate fuel injection forms in a fuel injection control apparatus intended for a compression self-igniting internal combustion engine that carries out a main injection and an auxiliary injection prior to the main injection.

Means of Solving the Problems

Principle of Solution to the Problems
The principle of solution of the present invention to achieve the above object will be described. 750K (mixture temperature 750K), which is the start temperature of a low-temperature oxidation reaction for diesel oil fuel, and 900K (mixture temperature 900K), which is the start temperature of a high-temperature oxidation reaction for diesel oil fuel, are brought into focus. Specifically, in order to separate the low-temperature oxidation reaction and the high-temperature oxidation reaction from one another, the injection time of the auxiliary injection is set using an in-cylinder gas temperature that is based on 750K as a reference so that such auxiliary injection makes the premixed combustion slow. That is, the in-cylinder gas temperature is used as a physical quantity to determine the injection time of the auxiliary injection so that the premixed combustion by the auxiliary injection is controlled in a temperature controlled manner.

Solution Means

The present invention is based on a fuel injection control apparatus applicable to control of a compression self-igniting internal combustion engine in which fuel injected into a cylinder from a fuel injection valve combusts in the cylinder. The fuel injection control apparatus is configured to carry out an operation of fuel injection from the fuel injection valve into the cylinder. The operation of fuel injection includes at least a main injection and an auxiliary injection. The main injection causes a combustion that mainly includes a diffusion combustion in the cylinder. The auxiliary injection is carried out prior to the main injection and causes a combustion that mainly includes a premixed combustion in the cylinder. In the fuel injection control apparatus, a fuel injection by the auxiliary injection ends before a gas temperature inside the cylinder reaches a temperature at which a fuel starts a low-temperature oxidation reaction.

With the present invention, a fuel injection by the auxiliary injection ends (the injection time of the auxiliary injection is determined) before a gas temperature inside the cylinder reaches a temperature at which a fuel starts a low-temperature oxidation reaction so that the premixed combustion by the auxiliary injection is separatable into a low-temperature oxidation reaction and a high-temperature oxidation reaction. This ensures a slow premixed combustion before the compression top dead center is reached, and ensures control of the premixed combustion in a temperature controlled manner in accordance with the transition of the in-cylinder gas temperature. This ensures unambiguous determination of the injection time of the auxiliary injection based on the in-cylinder temperature, and facilitates the attempt to simplify the fuel injection control. This, as a result, improves the controllability of fuel injection.

A specific configuration of the present invention is to set 750K for the temperature at which the fuel starts the low-temperature oxidation reaction, and to set an injection time of the auxiliary injection so that the fuel injection by the auxiliary injection ends before the in-cylinder gas temperature reaches 750K. Thus, an early auxiliary injection is carried out before the in-cylinder gas temperature reaches 750K. This makes the premixed combustion before the compression top dead center is reached separatable into a low-temperature oxidation reaction and a high-temperature oxidation reaction. This will be described below.

First, diesel oil, which is fuel for diesel engines, contains a low-temperature oxidation reaction component (which is a fuel of a straight chain single bond composition such as a normal cetane). The low-temperature oxidation reaction component starts an oxidation reaction at 750K. Most of the components other than the low-temperature oxidation reaction component start oxidation reactions (high-temperature oxidation reactions) at 900K.

This point is brought into focus in the present invention. As described above, the injection time of the auxiliary injection is set at a point of time before 750K is reached, so that the fuel injected at the auxiliary injection starts an oxidation reaction at the point of time when the in-cylinder gas temperature reaches 750K. This fuel injection control ensures that for example, as shown in FIG. 5, at the point of time when the compression gas temperature (in-cylinder gas temperature) reaches 750K in the compression process, the oxidation of the low-temperature oxidation reaction component in the sprayed fuel starts. This ensures generation of radicals (OH radicals), hydrogen peroxides ($H_2O_2$), and the like that promote H separation before 900K (which is the start temperature for the high-temperature oxidation reaction) is reached. This ensures reliable starting of the combustion (high-temperature oxidation reaction) of the remaining components at the point of time when the in-cylinder gas temperature (which is the start temperature for the high-temperature oxidation reaction) reaches 900K. Thus, the premixed combustion by the auxiliary injection is separatable into a low-temperature oxidation reaction and a high-temperature oxidation reaction.

Separating the premixed combustion into a low-temperature oxidation reaction and a high-temperature oxidation reaction in the above-described manner ensures that even when the transition from the low-temperature oxidation reaction to the high-temperature oxidation reaction deteriorates, the combustion gradient of the ignition time of diffusion combustion by the main injection is maintained. That is, the premixed combustion according to the present invention before the compression top dead center is reached is a combustion resulting from an early ignition by the early auxiliary injection, as described below. This creates an allowance of time before TDC, which ensures that even when the high-temperature oxidation reaction speed reduces or an ignition delay occurs, the allowance offsets the reduction of the high-temperature oxidation reaction speed or the ignition delay. Additionally, even when a ignition delay occurs, the in-cylinder gas temperature is on the increase (see FIG. 5), which improves the ignitability in the combustion field. With these advantageous effects combined, the ignition time of the diffusion combustion is stabilized, and combustions of high robustibility are achieved. Further, combustion noise is suppressed.

Additionally, the fuel injection (auxiliary injection) that causes a low-temperature oxidation reaction at the point of time when the compression gas temperature reaches 750K in the compression process is an early injection (for example, BTDC 40 to 25° CA) before the compression top dead center. This ensures a wide range of fuel injection, over a wide space, compared with a fuel injection made at a position closer to TDC (for example, at BTDC 25° CA or later), and realizes reductions in temperature and pressure in the combustion field. This makes the premixed combustion by the auxiliary injection slow, following a gradual temperature increase (in-cylinder gas temperature transition). This realizes combustions with suppressed amounts of NOx generation and smoke generation. Further, with the premixed combustion before the compression top dead center made slow, a loss (negative workload) in the compression process decreases.

Additionally, even when a change is made to the fuel composition (for example, when a fuel of a low cetane value is used), there is approximately no influence of the change of the fuel composition, since the combustion of the low-temperature oxidation reaction starts in a temperature controlled manner (see FIG. 6). Accordingly, the low-temperature oxidation reaction constantly and stably provides an ignition field for the high-temperature oxidation reaction. Thus, there is an additional advantage of little influence of a change of the fuel composition.

Next, the injection time of the auxiliary injection for the premixed combustion will be described.

<Injection Time of Auxiliary Injection>

The injection time of the auxiliary injection may be a time when the fuel injected at the auxiliary injection starts an oxidation reaction at the point of time when the in-cylinder gas temperature reaches 750K (which is the start temperature for the high-temperature oxidation reaction). Preferably, the injection time of the auxiliary injection may be a time when a spray of fuel injected at the auxiliary injection vaporizes entirely before the in-cylinder gas temperature reaches 750K.

Additionally, as described above, the fuel injection (auxiliary injection) that causes the low-temperature oxidation reaction at the time when the compression gas temperature reaches 750K is a BTDC early injection. As the injection time is advanced, a wider range of fuel injection, over a wide space, results. If, however, the injection time of the auxiliary injection is excessively advanced, unburned HCs (hydrocarbons) increase. In order to inhibit the increase, it is necessary to restrict the advance angle amount of the auxiliary injection using an advance angle guard value. The advance angle guard value may be determined by an experiment, a simulation, or the like in consideration of the amount of generation of unburned HCs.

It is noted that the injection time of the auxiliary injection may be a time after the in-cylinder gas temperature reaches 750K insofar as a radical (OH radical), hydrogen peroxide ($H_2O_2$), and the like that facilitate H separation are generated, so as to separate the low-temperature oxidation reaction from the high-temperature oxidation reaction, before the in-cylinder gas temperature reaches 900K (which is the start temperature for the high-temperature oxidation reaction).

Effects of the Invention

With the present invention, the fuel injection by the auxiliary injection ends before the gas temperature inside the cylinder reaches the temperature at which the fuel starts the low-temperature oxidation reaction, in a fuel injection control apparatus of a compression self-igniting internal combustion engine that is configured to carry out the main injection causing a combustion mainly including a diffusion combustion and the auxiliary injection carried out prior to the main injection and causing a combustion mainly including the premixed combustion. This ensures a slow premixed combustion and ensures control of the premixed combustion in a temperature controlled manner in accordance with the transition of the in-cylinder gas temperature. This realizes systematic fuel injection control that facilitates the attempt to make appropriate injection modes.

BRIEF DESCRIPTION OF DRAWINGS

FIG. 6 also shows a waveform diagram of the fuel injection rate.

DETAILED DESCRIPTION

Figure 1:
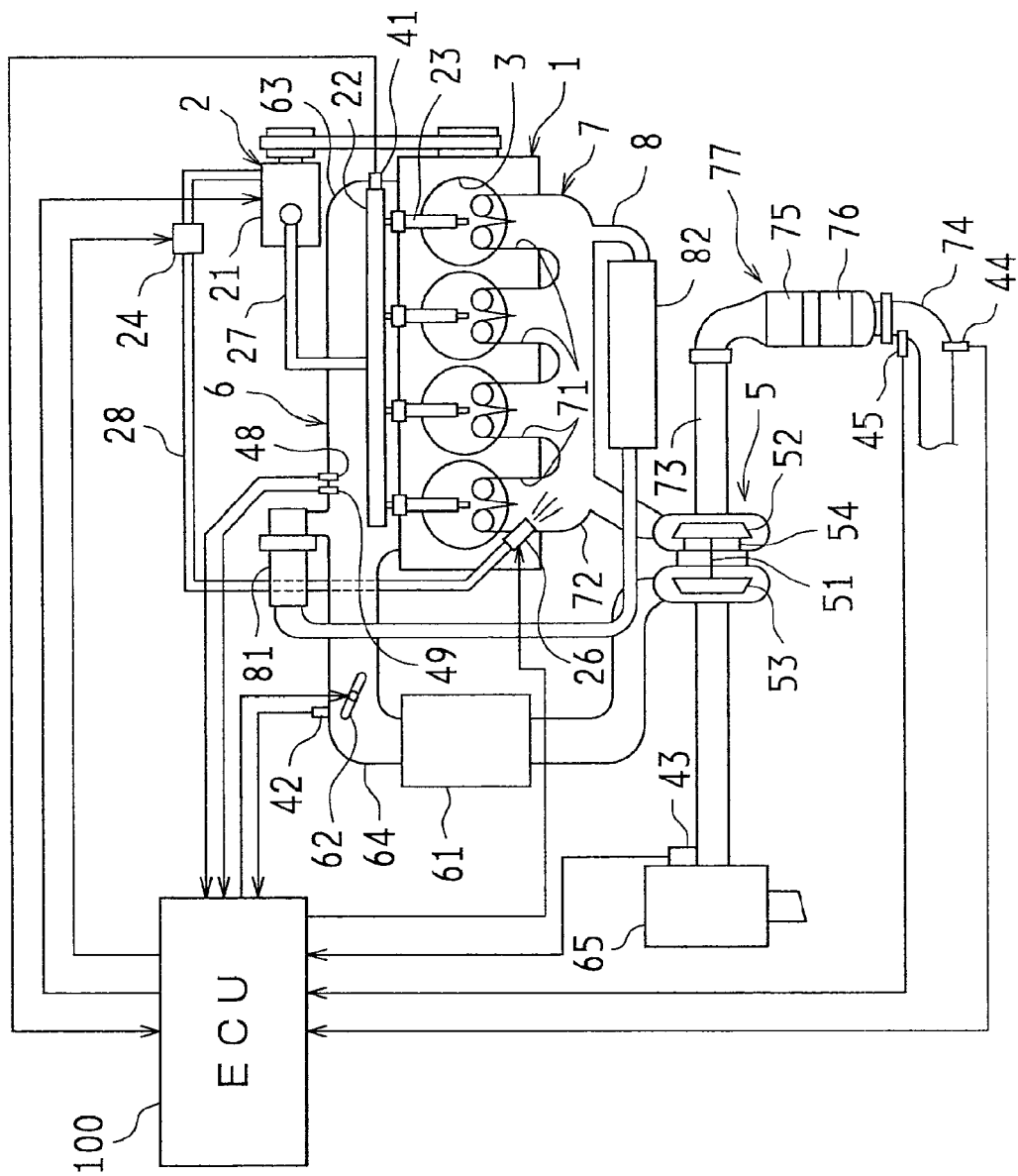
FIG. 1 is a schematic configuration diagram of an engine and a control system for the same to which the present invention is applied.

Embodiments of the present invention will be described below by referring to the drawings.

In this embodiment, description will be given with regard to a case where the present invention is applied to a common rail in-cylinder direct injection multi-cylinder (for example, inline four-cylinder) diesel engine (compression self-igniting internal combustion engine) mounted in an automobile.

Engine Configuration

Figure 2:
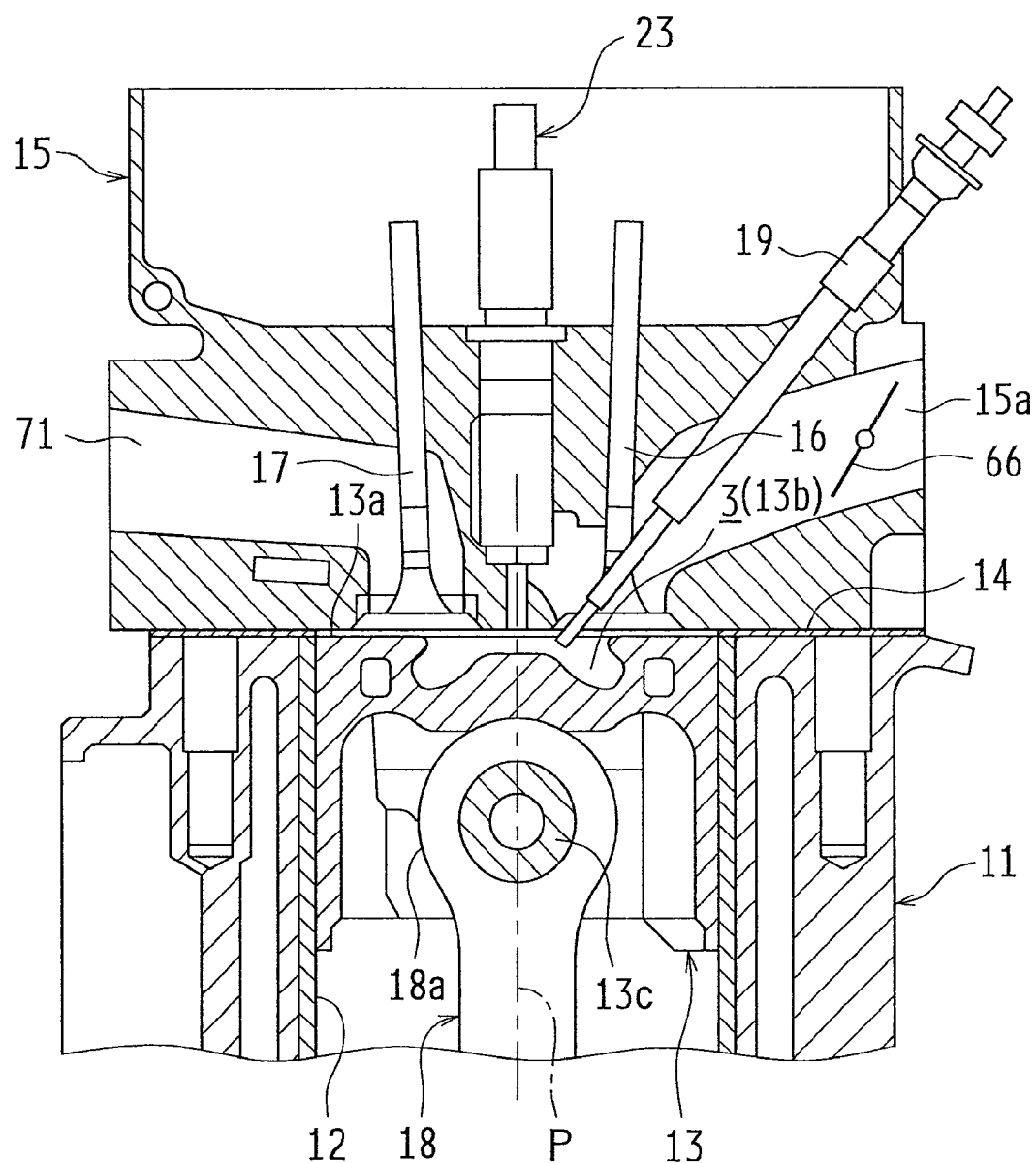
FIG. 2 is a cross-sectional view of a combustion chamber of a diesel engine and its peripherals.

First, one example of a diesel engine (hereinafter referred to simply as an engine) to which the present invention is applied will be described. FIG. 1 is a schematic view of an engine 1 and its control system. FIG. 2 is a cross-sectional view of a combustion chamber 3 of the diesel engine and peripheral parts of the combustion chamber 3.

As shown in FIG. 1, the engine 1 of this example is configured as a diesel engine system including, as main units, a fuel supply system 2, combustion chambers 3, an intake system 6, and an exhaust system 7.

The fuel supply system 2 includes a supply pump 21, a common rail 22, injectors (fuel injection valves) 23, a cutoff valve 24, a fuel addition valve 26, an engine fuel path 27, and an added fuel path 28.

The supply pump 21 draws fuel from a fuel tank, and after putting the drawn fuel under high pressure, supplies that fuel to the common rail 22 via the engine fuel path 27. The common rail 22 has a function as an accumulation chamber where high pressure fuel supplied from the supply pump 21 is held (accumulated) at a predetermined pressure, and distributes the accumulated fuel to each injector 23. The injectors 23 are configured as piezo injectors within which a piezoelectric element (piezo element) is disposed and which supply fuel by injection into the combustion chambers 3 by appropriately opening a valve. The details of control of fuel injection from the injectors 23 will be described later.

The supply pump 21 supplies part of the fuel drawn from the fuel tank to the fuel addition valve 26 via the added fuel path 28. In the added fuel path 28, the cutoff valve 24 is disposed in order to stop fuel addition by cutting off the added fuel path 28 during an emergency.

Also, the fuel addition valve 26 is configured as an electronically controlled opening/closing valve whose valve opening time is controlled with an addition control operation by an ECU 100, described later, such that the amount of fuel added to the exhaust system 7 is a target addition amount (an addition amount such that the exhaust A/F equals the target A/F), and such that a fuel addition timing is a predetermined timing. That is, a desired amount of fuel from the fuel addition valve 26 is supplied by injection to the exhaust system 7 (to an exhaust manifold 72 from exhaust ports 71) at an appropriate timing.

The intake system 6 includes an intake manifold 63 coupled to an intake port 15a formed in a cylinder head 15 (see FIG. 2), and an intake tube 64 constituting an intake path is coupled to the intake manifold 63. Also, in the intake path, an air cleaner 65, an airflow meter 43, and a throttle valve (an intake throttle valve) 62 are disposed in this order from the upstream side. The airflow meter 43 outputs an electrical signal corresponding to the amount of air that flows into the intake path via the air cleaner 65.

As shown in FIG. 2, the intake system 6 includes a swirl control valve (swirl speed variable mechanism) 66 to vary a swirl flow (swirl flow in the horizontal direction) in the combustion chamber 3. Specifically, the intake port 15a in each cylinder includes two systems, namely, a normal port and a swirl port. In the normal port 15a shown in FIG. 2, which is among the two systems, the swirl control valve 66 is disposed having a butterfly valve whose opening degree is adjustable. The swirl control valve 66 is linked with an actuator, not shown. The actuator drivingly adjusts the opening degree of the swirl control valve 66, and in accordance with the opening degree, the amount of air flow through the normal port 15a is changed. As the opening degree of the swirl control valve 66 increases, the amount of air drawn through the normal port 15a into the cylinder increases. This makes a swirl generated in the swirl port (not shown in FIG. 2) relatively small, and turns the interior of the cylinder into a low swirl state (which is a state of low swirl speed). Conversely, as the opening degree of the swirl control valve 66 decreases, the amount of air drawn through the normal port 15a into the cylinder decreases. This makes the swirl generated in the swirl port relatively high, and turns the interior of the cylinder into a high swirl state (which is a state of high swirl speed).

The exhaust system 7 includes the exhaust manifold 72 coupled to the exhaust ports 71 formed in the cylinder head 15, and exhaust tubes 73 and 74 constituting an exhaust path are coupled to the exhaust manifold 72. In this exhaust path, a maniverter (exhaust purification apparatus) 77 is disposed that includes a NOx storage catalyst (NSR catalyst: NOx Storage Reduction catalyst) 75 and a DPNR catalyst (Diesel Particulate-NOx Reduction catalyst) 76. The NSR catalyst 75 and DPNR catalyst 76 will be described below.

The NSR catalyst 75 is a storage reduction NOx catalyst and includes, for example alumina ($Al_2O_3$) as a support. The support supports, for example: an alkali metal such as potassium (K), sodium (Na), lithium (Li), and cesium (Cs); an alkaline earth element such as barium (Ba) and calcium (Ca); a rare earth element such as lanthanum (La) and Yttrium (Y); and a precious metal such as platinum (Pt).

The NSR catalyst 75 stores NOx in a state in which a large amount of oxygen is present in the exhaust, while reducing NOx to $NO_2$ or NO to release NOx in a state in which the oxygen concentration in the exhaust is low and a large amount of a reduction component (for example, an unburned component (HC) of fuel) is present. NOx released as $NO_2$ or NO is further reduced to $N_2$ due to quick reaction with HC or CO in the exhaust. Also, by reducing $NO_2$ or NO, HC and CO themselves are oxidized and thus become $H_2O$ or $CO_2$. That is, by appropriately adjusting the oxygen concentration or the HC component in the exhaust introduced to the NSR catalyst 75, HC, CO, and NOx in the exhaust are purified. In the configuration of this embodiment, the oxygen concentration and the HC component in the exhaust are adjustable with the operation of adding fuel from the fuel addition valve 26.

The DPNR catalyst 76 includes, for example, a porous ceramic structure that supports a NOx storage reduction catalyst; so that PM in exhaust gas is captured when passing through a porous wall. When the air-fuel ratio of the exhaust gas is lean, NOx in the exhaust gas is stored in the NOx storage reduction catalyst, while when the air-fuel ratio is rich, the stored NOx is reduced and released. Furthermore, the DPNR catalyst 76 supports a catalyst that oxidizes/burns the captured PM (for example, an oxidization catalyst whose main component is a precious metal such as platinum).

Now, the configuration of the combustion chamber 3 of the diesel engine and peripheral parts of the combustion chamber 3 will be described by referring to FIG. 2. As shown in FIG. 2, in a cylinder block 11, which constitutes a part of the main body of the engine, a cylindrical cylinder bore 12 is formed in each of the cylinders (four cylinders), and each cylinder bore 12 vertically slidably accommodates a piston 13.

The combustion chamber 3 is formed on the top side of a top face 13a of the piston 13. That is, the combustion chamber 3 is defined by a lower face of the cylinder head 15 installed on top of the cylinder block 11 via a gasket 14, an inner wall face of the cylinder bore 12, and the top face 13a of the piston 13. In approximately the center of the top face 13a of the piston 13, a cavity (a recessed unit) 13b is disposed in the form of a depression, and the cavity 13b also constitutes a part of the combustion chamber 3.

The shape of the cavity 13b is such that the size of depression at the center portion (on a cylinder center line P) is small and gradually increases toward the outer peripheral side. That is, as shown in FIG. 2, when the piston 13 is adjacent to its compression top dead center, the combustion chamber 3 defined by the cavity 13b has a small portion of space of relatively small capacity at the center portion, and a gradually expanded portion of space (which is assumed an expanded space) toward the outer peripheral side.

A small end 18a of a connecting rod 18 is coupled to the piston 13 via a piston pin 13c, while a large end of the connecting rod 18 is coupled to a crankshaft serving as an engine output shaft. This ensures that the reciprocating movement of the piston 13 within the cylinder bore 12 is transmitted to the crankshaft via the connecting rod 18, which causes the crankshaft to rotate to obtain engine output. Also, a glow plug 19 is disposed facing the combustion chamber 3. The glow plug 19 functions as a starting assistance apparatus that glows by receiving a flow of electrical current immediately before the engine 1 is started, and that receives a blow of part of a fuel spray, thus promoting ignition and combustion.

The cylinder head 15 includes the intake port 15a (the normal port and the swirl port) formed to introduce air to the combustion chamber 3, the exhaust port 71 formed to discharge exhaust gas from the combustion chamber 3, an intake valve 16 disposed to open/close the intake port 15a, and an exhaust valve 17 disposed to open/close the exhaust port 71. The intake valve 16 and the exhaust valve 17 are disposed to face one another across the cylinder center line P. That is, the engine 1 of this example is configured as a cross flow-type engine. Also, the injector 23, which injects fuel directly into the combustion chamber 3, is mounted in the cylinder head 15. The injector 23 is disposed in approximately the center above the combustion chamber 3 in upright orientation along the cylinder center line P, and injects fuel introduced from the common rail 22 toward the combustion chamber 3 at a predetermined timing.

As shown in FIG. 1, a supercharger (turbocharger) 5 is disposed in the engine 1. The turbocharger 5 includes a turbine wheel 52 and a compressor impeller 53 that are coupled to one another via a turbine shaft 51. The compressor impeller 53 is disposed facing the inside of the intake tube 64, while the turbine wheel 52 is disposed facing the inside of the exhaust tube 73. This ensures that the turbocharger 5 utilizes exhaust flow (exhaust pressure) received by the turbine wheel 52 to rotate the compressor impeller 53, so as to implement what is called a turbocharging operation such as increasing the intake pressure. The turbocharger 5 of this example is a variable nozzle-type turbocharger (VNT), in which a variable nozzle vane mechanism 54 is provided on the turbine wheel 52 side. Adjusting the opening degree (VN opening degree) of the variable nozzle vane mechanism 54 ensures adjustment of the turbocharging pressure of the engine 1.

The intake tube 64 of the intake system 6 includes an intercooler 61 that forcibly cools intake air heated by supercharging with the turbocharger 5. The throttle valve 62 is disposed further downstream than the intercooler 61. The throttle valve 62 is an electronically controlled opening/closing valve whose opening degree is capable of stepless adjustment, and has a function to constrict the area of the path of intake air under predetermined conditions, and thus to adjust (reduce) the supplied amount of intake air.

The engine 1 also includes an exhaust gas recirculation path (EGR path) 8 that couples the intake system 6 and the exhaust system 7 to one another. The EGR path 8 appropriately recirculates part of the exhaust to the intake system 6 and resupplies the part of the exhaust to the combustion chamber 3, so as to decrease the combustion temperature. Thus, the amount of produced NOx is reduced. The EGR path 8 includes an EGR valve 81 that is opened/closed steplessly under electronic control and is configured to freely adjust the amount of exhaust flow that flows through the EGR path 8, and an EGR cooler 82 that cools exhaust passing through (recirculates through) the EGR path 8. The EGR path 8, the EGR valve 81, the EGR cooler 82, and the like constitute an EGR apparatus (exhaust gas recirculation apparatus).

Sensors

Various sensors are mounted on the parts of the engine 1 to output signals related to environmental conditions at each part and the operating states of the engine 1.

For example, the airflow meter 43 outputs a detection signal according to an intake air flow amount (intake air amount) on the upstream of the throttle valve 62 within the intake system 6. An intake temperature sensor 49 is disposed in the intake manifold 63 and outputs a detection signal according to the temperature of intake air. An intake pressure sensor 48 is disposed in the intake manifold 63 and outputs a detection signal according to the intake air pressure. An A/F (air-fuel ratio) sensor 44 outputs a detection signal that continuously changes according to the oxygen concentration in the exhaust on the downstream of the maniverter 77 of the exhaust system 7. An exhaust temperature sensor 45 outputs a detection signal according to the temperature of exhaust gas (exhaust temperature) likewise on the downstream of the maniverter 77 of the exhaust system 7. A rail pressure sensor 41 outputs a detection signal according to the pressure of fuel accumulated in the common rail 22. A throttle opening degree sensor 42 detects the opening degree of the throttle valve 62.

ECU

Figure 3:
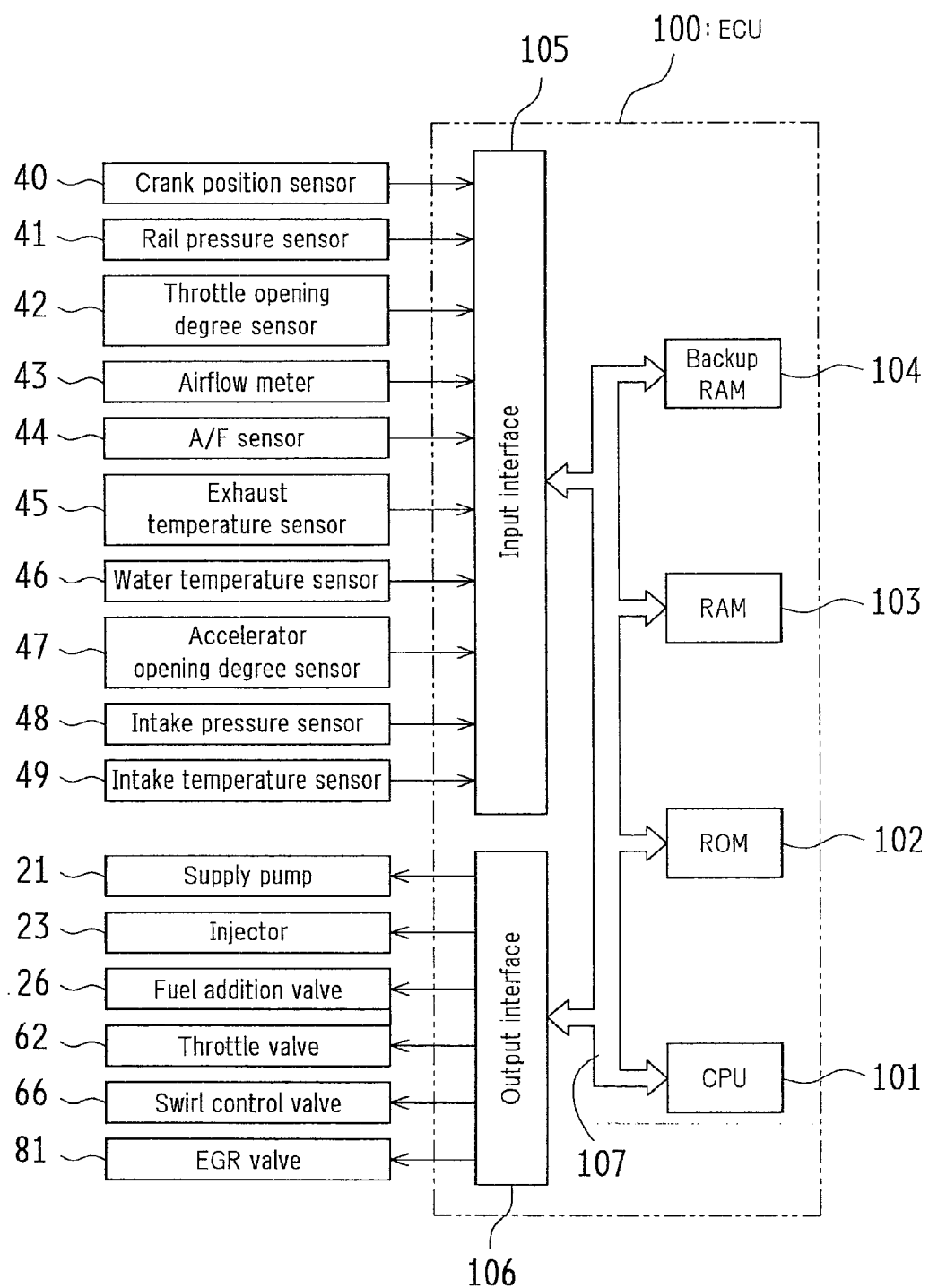
FIG. 3 is a block diagram illustrating a configuration of a control system such as an ECU.

As shown in FIG. 3, the ECU (Electronic Control Unit) 100 includes a CPU (Central Processing Unit) 101, a ROM (Read Only Memory) 102, a RAM (Random Access Memory) 103, and a backup RAM 104. The ROM 102 stores various control programs, maps that are referred to when executing those various control programs, and the like. The CPU 101 executes various arithmetic processes based on the various control programs and maps stored in the ROM 102. The RAM 103 is a memory that temporarily stores results of arithmetic operations with the CPU 101 or data input from the sensors, and the like. The backup RAM 104 is a nonvolatile memory that stores data that needs storing or the like when, for example, the engine 1 is stopped.

The CPU 101, the ROM 102, the RAM 103, and the backup RAM 104 above are coupled to each other via a bus 107, and are coupled to an input interface 105 and an output interface 106.

The rail pressure sensor 41, the throttle opening degree sensor 42, the airflow meter 43, the A/F sensor 44, the exhaust temperature sensor 45, the intake pressure sensor 48, and the intake temperature sensor 49 are coupled to the input interface 105. Further coupled to the input interface 105 are a water temperature sensor 46 that outputs a detection signal according to the coolant temperature of the engine 1, an accelerator opening degree sensor 47 that outputs a detection signal according to the amount of pressing of an accelerator pedal, a crank position sensor 40 that outputs a detection signal (pulse) at each rotation of an output shaft (crankshaft) of the engine 1 by a predetermined angle, and the like.

The supply pump 21, the injector 23, the fuel addition valve 26, the throttle valve 62, the variable nozzle vane mechanism 54, the EGR valve 81, and the like are coupled to the output interface 106.

Then, the ECU 100 executes various kinds of control of the engine 1 based on the output of the various sensors described above.

The ECU 100 executes the control of fuel injection of the injector 23. As the control of fuel injection of the injector 23, an auxiliary injection (pilot injection) and a main injection (main injection) are executed.

This embodiment has the following features. The auxiliary injection causes a combustion that mainly includes a premixed combustion (referred to as premixed combustion), while the main injection causes a combustion that mainly includes a diffusion combustion (referred to as diffusion combustion). As described later, the auxiliary injection is an early injection carried out before the compression top dead center of the piston 13, so as to separate the gravity center of the premixed combustion from the gravity center of the diffusion combustion (for example, a crank angle at which the heat production rate is highest) (see FIG. 5). Separating the premixed combustion and the diffusion combustion from one another in this manner ensures utilization of the advantages of both combustions, and facilitates the attempt to improve exhaust emissions and to stabilize the combustions.

The main injection is an injection operation for generating torque of the engine 1 (torque-generating fuel supply operation). The amount of injection in the main injection is basically determined according to operating states such as engine revolution, amount of accelerator operation, coolant temperature, and intake air temperature, so as to obtain a required torque. For example, the obtained torque required value of the engine 1 increases as the engine revolution (engine revolution calculated based on an output signal of the crank position sensor 40) increases, and as the accelerator operation amount (amount of pressing of accelerator pedal detected by the accelerator opening degree sensor 47) increases (as the accelerator opening degree increases). Accordingly, a larger fuel injection amount is set in the main injection.

The auxiliary injection is an operation that pre-injects fuel prior to the main injection from the injector 23. The auxiliary injection will be described in detail later.

In this embodiment, the main injection is carried out while the interior of the combustion chamber 3 (the interior of the cylinder) is adequately preheated by the premixed combustion by the auxiliary injection. This ensures that the fuel injected at the main injection into the combustion chamber 3 is immediately exposed to a temperature environment of equal to or higher than a self-ignition temperature to develop thermolysis. Thus, the combustion starts immediately after the injection.

Specifically, the ignition delay of fuel in the diesel engine is classified into a physical delay and a chemical delay. The physical delay corresponds to a time required for the evaporation and mixture of fuel droplets, which depends on the gas temperature of the combustion field. In contrast, the chemical delay corresponds to a time required for chemical bonding, decomposition, and exothermic oxidation of fuel vapor. When the interior of the combustion chamber is adequately preheated by the premixed combustion by the auxiliary injection, the physical delay is minimized. As the result, the ignition delay is also minimized. This makes the combustion form of the combustion by the fuel injected at the main injection mostly the diffusion combustion, with approximately no premixed combustion. Adjusting the injection time and the fuel injection amount for the auxiliary injection also ensures control the ignition time of the diffusion combustion, the change rate of the heat production rate [J/CA] (that is, the gradient of the heat production rate waveform), the peak of the heat production rate, and the time required to reach the combustion gravity center.

The injection time of the main combustion for the diffusion combustion may be delayed relative to TDC so as to delay the diffusion combustion is delayed (that is, to delay the combustion gravity center of the diffusion combustion is delayed). This reduces the amount of NOx generation.

It is noted that, in addition to the auxiliary injection and main injection described above, after-injection or post-injection is executed as needed. The after-injection is an injection operation for increasing the exhaust gas temperature. More specifically, the after-injection is executed at a timing such that the combustion energy of fuel supplied is not converted to the torque of the engine 1, but rather, a majority of the combustion energy is obtained as exhaust heat energy. The post-injection is an injection operation for achieving an increase in temperature of the maniverter 77 by directly introducing fuel to the exhaust system 7. For example, the post injection is executed when the deposited amount of PM captured by the DPNR catalyst 76 exceeds a predetermined amount (which is detected by, for example, detecting a difference in pressure between the front and rear of the maniverter 77).

Fuel Injection Pressure

The fuel injection pressure during execution of the fuel injection is determined by the internal pressure of the common rail 22. The common rail internal pressure is generally such that the target value of the fuel pressure supplied from the common rail 22 to the injector 23, that is, the target rail pressure, is set to increase as the engine load (engine load) increases, and as the engine revolution (engine revolution) increases. That is, when the engine load is high, a large amount of air is drawn into the combustion chamber 3, so that it is necessary to inject a large amount of fuel into the combustion chamber 3 from the injector 23. This necessitates high injection pressure from the injector 23. When the engine revolution is high, the period during which injection is executable is short, so that it is necessary to inject a large amount of fuel per unit time. This necessitates high injection pressure from the injector 23. Thus, the target rail pressure is generally set based on the engine load and the engine revolution. It is noted that the target rail pressure is set, for example, in accordance with a fuel pressure setting map stored in the ROM 102. That is, determining the fuel pressure in accordance with the fuel pressure setting map ensures control of a valve opening period (injection ratio waveform) of the injector 23, thereby specifying a fuel injection amount during the valve opening period.

It is noted that in this embodiment, fuel pressure is adjusted between 30 MPa and 200 MPa according to the engine load and the like. That is, the control range of the fuel pressure has a lowest value of 30 MPa and a highest value of 200 MPa.

The fuel injection amount has optimum values that vary according to the temperature conditions of the engine 1, intake air, and the like. For example, the ECU 100 adjusts the amount of fuel discharged by the supply pump 21 such that the common rail pressure equals the target rail pressure set based on the engine operating state, that is, such that the fuel injection pressure matches the target injection pressure. Also, the ECU 100 determines the fuel injection amount and the fuel injection form based on the engine operating state. Specifically, the ECU 100 calculates an engine revolution speed based on the output signal of the crank position sensor 40 and obtains an amount of pressing of the accelerator pedal (accelerator opening degree) based on the output signal of the accelerator opening degree sensor 47, and determines the total fuel injection amount (the sum of the injection amount in the auxiliary injection and the injection amount of in the main injection) based on the engine revolution speed and the accelerator opening degree.

The ECU 100 controls the opening degree of the EGR valve 81 according to the operating state of the engine 1, and adjusts the exhaust gas recirculation amount (EGR amount) for the intake manifold 63. The EGR amount is set in accordance with an EGR map stored in advance in the ROM 102. Specifically, the EGR map is a map to determine the EGR amount (EGR ratio) according to parameters such as engine revolution and engine load. It is noted that the EGR map is produced in advance by an experiment, a simulation, or the like. That is, the engine revolution calculated based on the output signal of the crank position sensor 40, and the opening degree (corresponding to engine load) of the throttle valve 62 detected by the throttle opening degree sensor 42 are applied to the EGR map, so that the EGR amount (opening degree of the EGR valve 81) is obtained.

The above-described programs executed by the ECU 100 realize the fuel injection control apparatus of the internal combustion engine according to the present invention.

General Description of Combustion Form

Next, description will be given with regard to an outline of the combustion form in the combustion chamber 3 of the engine 1 according to this embodiment.

Figure 4:
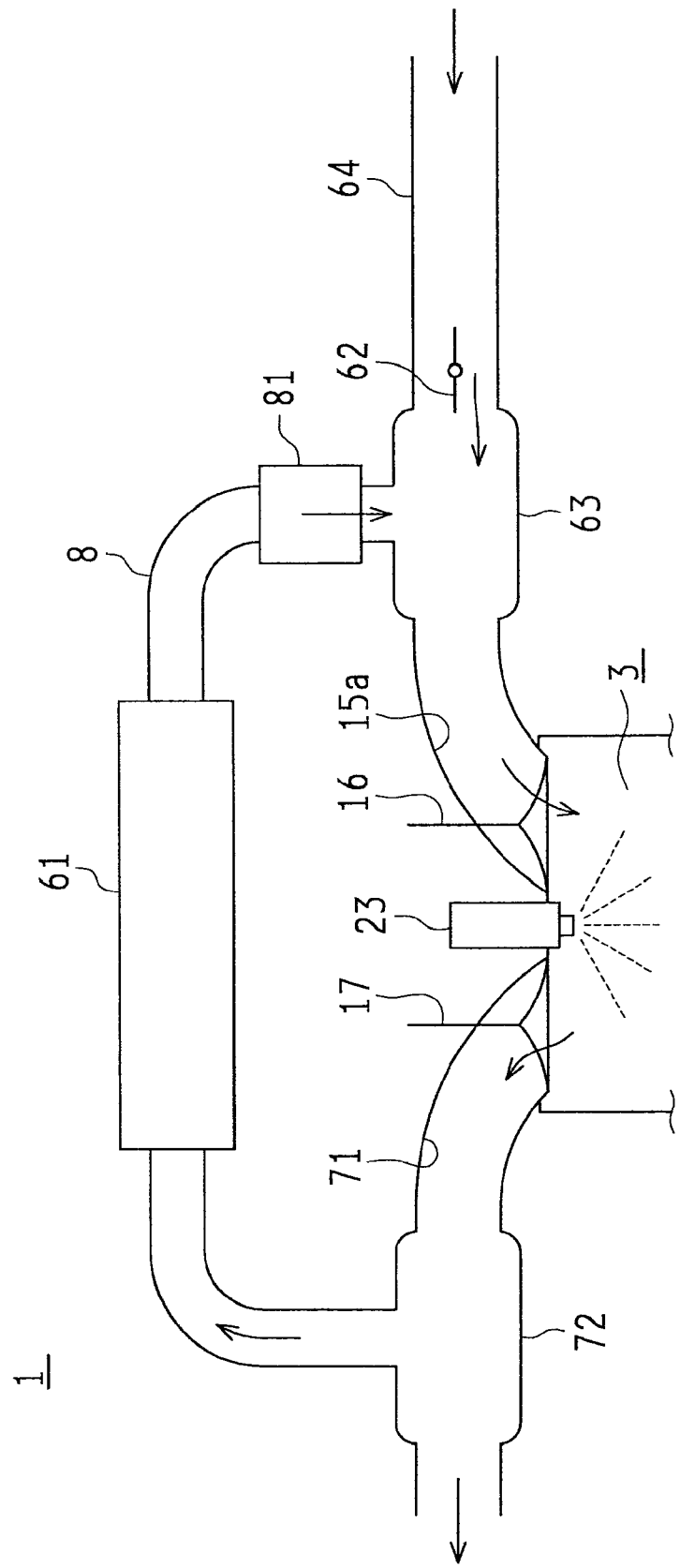
FIG. 4 is a schematic view of an intake-exhaust system and a combustion chamber illustrating an outline of combustion form in the combustion chamber.

FIG. 4 is a diagram schematically illustrating that gas (air) is drawn into one cylinder of the engine 1 via the intake manifold 63 and the intake port 15*a*, that fuel is injected from the injector 23 into the combustion chamber 3 to effect a combustion, and that the gas subjected to the combustion is discharged into the exhaust manifold 72 via the exhaust port 71.

As shown in FIG. 4, the gas drawn into the cylinder includes fresh air, which is drawn from the intake tube 64 via the throttle valve 62, and EGR gas, which is drawn from the EGR path 8 when the EGR valve 81 is open. The ratio (that is, EGR ratio) of the EGR gas amount to the sum of the drawn fresh air amount (mass) and the drawn EGR gas amount (mass) varies depending on the opening degree of the EGR valve 81, which is appropriately controlled by the ECU 100 according to the operating state.

The fresh air and the EGR gas drawn in the cylinder (in the combustion chamber 3) in this manner are drawn into the cylinder via the intake valve 16 that opens during the intake process in accordance with the fall of the piston 13 (not shown in FIG. 4), and thus turns into in-cylinder gas. The in-cylinder gas is sealed (a trapping state of the in-cylinder gas) in the cylinder (the combustion chamber 3) by closing the intake valve 16 at a valve-closing time determined according to the operating state of the engine 1, and compressed as the piston 13 ascends in the subsequent compression process. Then, when the piston 13 reaches adjacent to its top dead center, the valve of the injector 23 is opened only for a predetermined period of time according to the injection amount control by the ECU 100 described above, so as to directly inject fuel into the combustion chamber 3. Specifically, the auxiliary injection is executed before the piston 13 reaches its top dead center, and after fuel injection is temporarily stopped, a predetermined interval is established, followed by the main injection executed upon reaching of the piston 13 to adjacent the compression top dead center (or after the compression top dead center).

Next, the fuel injection control will be described.

Diesel Oil Fuel

Diesel oil fuel used in diesel engines is based on hydrocarbons of C=10 to 15 and roughly classified into straight chained, side chained (branched), and cyclic, in terms of the arrangement of the carbons. In the arrangements of the carbons, the state of bonding between the carbons includes single bonds, double bonds, and triple bonds.

Figure 11:
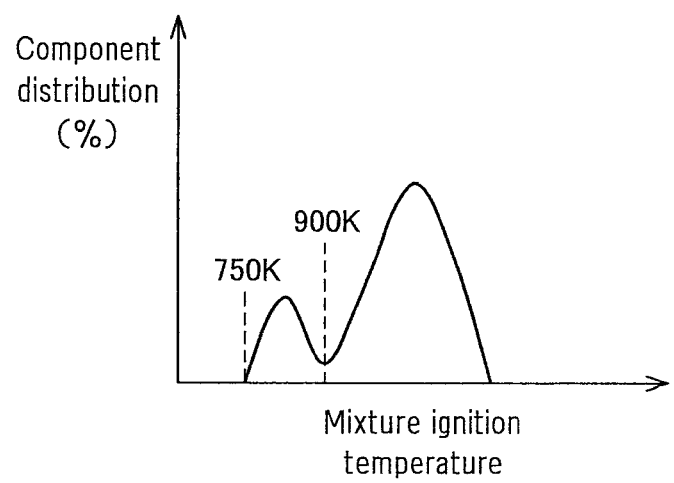
FIG. 11 is a graph showing the ignition temperature of a mixture of diesel oil and air in relation to a diesel oil component.

After the fuel is heated and vaporized due to the in-cylinder gas temperature, some of the carbon chains repeat oxidation-reduction reactions, and the chain bonds between the carbon chains are separated, followed by a transition to the combustion and oxidation ($CO_2$) of the carbons themselves. The temperature (heat energy) required for the decomposition process of the carbon chains varies depending on the composition. FIG. 11 shows an image of physical properties seen in the products currently on the market. The low-temperature oxidation reaction is largely attributed to a fuel of a straight chain and single bond composition, examples including normal cetane. The low-temperature oxidation reaction starts at 750K, as described above. The order of low-temperature self-ignition is [straight chain]>[side chain]>[ring shape], and [single crystal]>[double bond]>[triple bond].

Low-Temperature Oxidation Reaction and High-Temperature Oxidation Reaction

The low-temperature oxidation reaction is largely attributed to normal paraffin hydrocarbons contained in diesel oil fuel. As the straight chain becomes longer, the low-temperature oxidation reaction develops. The starting temperature and the reaction amount of the high-temperature oxidation reaction are determined based on a reaction of a high monocular straight chain hydrocarbon turning into a radical having an unpaired electron, based on radicals accumulated through reactions to generate hydrogen peroxides, and based on the density of hydrogen peroxide ($H_2O_2$).

The low-temperature oxidation reaction is a reaction where each of the molecules reacts by its own. Hence, the low-temperature oxidation reaction occurs irrespective of the degree of spray decentralization. In contrast, the high-temperature oxidation reaction largely depends on how many radicals or hydrogen peroxides, which promote H separation, exist in the vicinity of the hydrocarbon molecules. The high-temperature oxidation reaction starts at 900K, as described above. It is noted that the high-temperature oxidation reaction requires a predetermined fuel density (space density), and thus it is necessary, before the start temperature of the high-temperature oxidation reaction is reached, to generate a spray distribution of a density having sufficient radicals, hydrogen peroxides, and oxygen. To ensure such spray distribution, an appropriate fuel injection amount (premixed combustion amount) needs to be secured.

Auxiliary Injection Control

This embodiment has the following features. In the compression process, the auxiliary injection is carried out before the in-cylinder gas temperature reaches 750K so as to make the premixed combustion by the auxiliary injection a temperature controlled combustion that accords with the transition of the in-cylinder gas temperature. The premixed combustion is separatable into a low-temperature oxidative reaction and a high-temperature oxidative reaction. The separation of the premixed combustion and the temperature controlled combustion will be described below.

(Separation of Premixed Combustion)

First, the auxiliary injection is an early injection carried out before the in-cylinder gas temperature reaches 750K, and the fuel spray injected at the auxiliary injection is vaporized before the in-cylinder gas temperature reaches 750K. This ensures that the high-temperature xidation reaction starts at 900K, and ensures a combustion having an allowance before TDC is reached. To achieve this combustion, the auxiliary injection of this embodiment is a BTDC early injection (compression ratio 15:BTDC 40 to 25° CA). The BTDC early injection ensures a wide range of fuel injection, over a wide space, compared with a fuel injection made at a position closer to TDC (at BTDC 25° CA or later), and realizes reductions in temperature and pressure in the combustion field. This makes the premixed combustion by the auxiliary injection slow, following a gradual temperature increase. This realizes combustions with suppressed amounts of NOx generation and smoke generation. Further, with the premixed combustion before the compression top dead center made slow, a loss (negative workload) in the compression process decreases.

Figure 5:
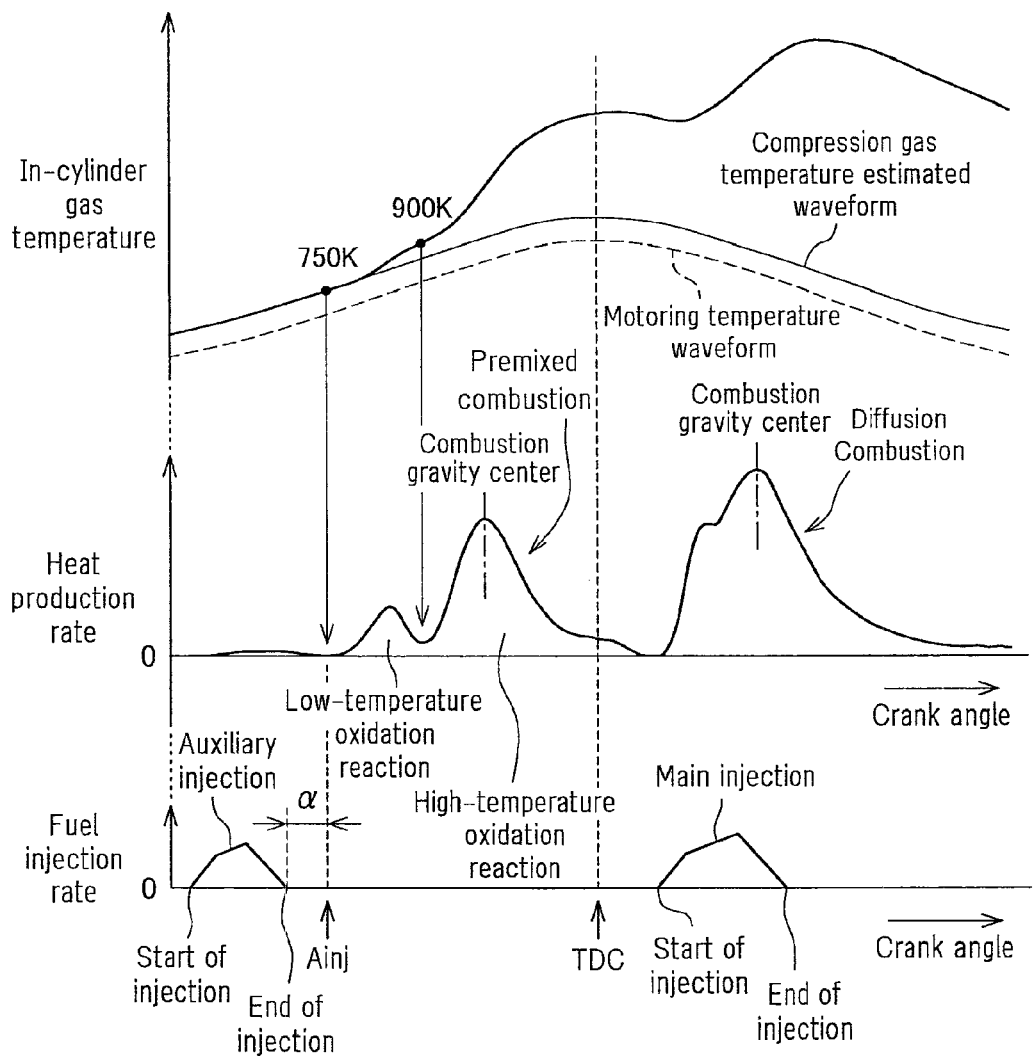
FIG. 5 shows waveform diagrams illustrating exemplary changes in heat production rate (heat production amount per unit rotation angle of a crankshaft) in the compression and expansion processes, exemplary changes in fuel injection rate (fuel injection amount per unit rotation angle of the crankshaft), and exemplary changes in in-cylinder gas temperature.

Additionally, the auxiliary injection carried out before the in-cylinder gas temperature in the compression process reaches 750K ensures that for example, as shown in FIG. 5, at the point of time when the in-cylinder gas temperature (compression gas temperature) reaches 750K, the oxidation of the low-temperature oxidation reaction component in the sprayed fuel starts. This ensures generation of radicals (OH radicals), hydrogen peroxides ($H_2O_2$), and the like that promote H separation before 900K (which is the start temperature for the high-temperature oxidation reaction) is reached. This ensures reliable starting of the combustion (high-temperature oxidation reaction) of the remaining components at the point of time when the in-cylinder gas temperature (which is the start temperature for the high-temperature oxidation reaction) reaches 900K. Thus, the premixed combustion by the auxiliary injection is separatable into a low-temperature oxidation reaction and a high-temperature oxidation reaction.

Separating the premixed combustion into a low-temperature oxidation reaction and a high-temperature oxidation reaction extends the premixed combustion period and maximizes the premixed combustion amount. This creates an allowance of time before TDC, which ensures that even when the high-temperature oxidation reaction speed reduces or an ignition delay occurs, the allowance offsets the reduction of the high-temperature oxidation reaction speed or the ignition delay. Additionally, even when a ignition delay occurs, the in-cylinder gas temperature is on the increase (see FIG. 5), which improves the ignitability in the combustion field. This stabilizes the ignition time of the diffusion combustion, and achieves combustions of high robustibility. Further, combustion noise is suppressed.

Figure 6:
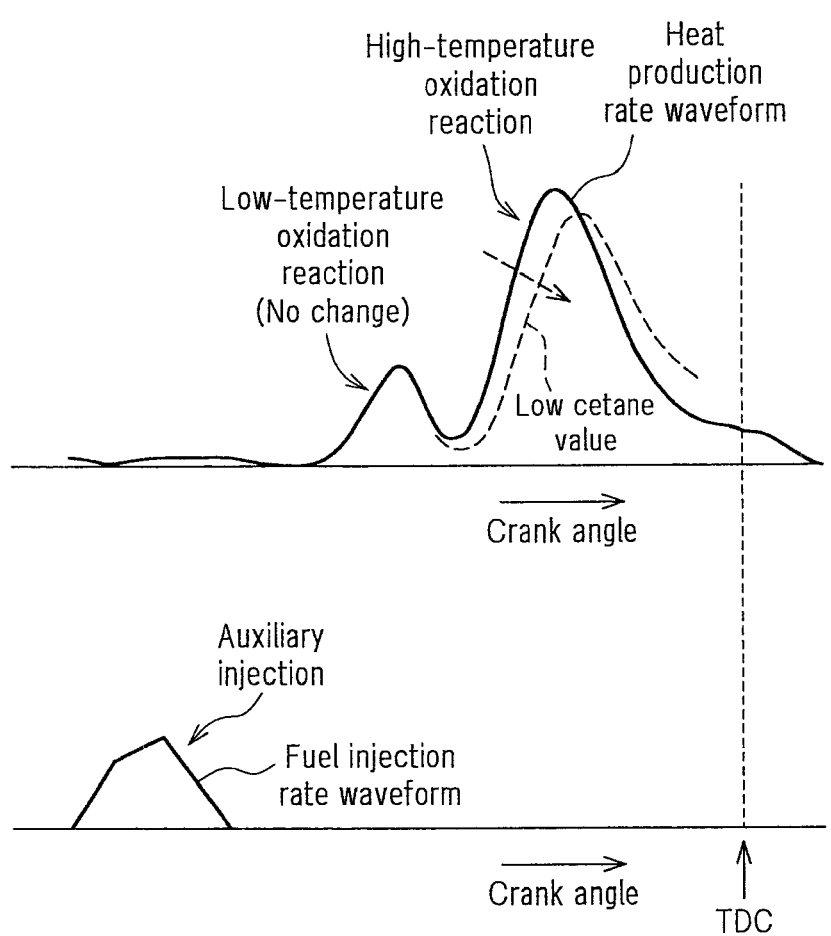
FIG. 6 is a waveform diagram illustrating changes in heat production rate when a change is made to the fuel composition.

Additionally, even when a change is made to the composition of the fuel that is used (for example, when a fuel of a low cetane value is used), there is approximately no influence of the change of the fuel composition, since the combustion of the low-temperature oxidation reaction starts in a temperature controlled manner (see FIG. 6). Accordingly, the low-temperature oxidation reaction stably provides an ignition field for the high-temperature oxidation reaction. Thus, there is an additional advantage of little influence of a change of the fuel composition.

Figure 7:
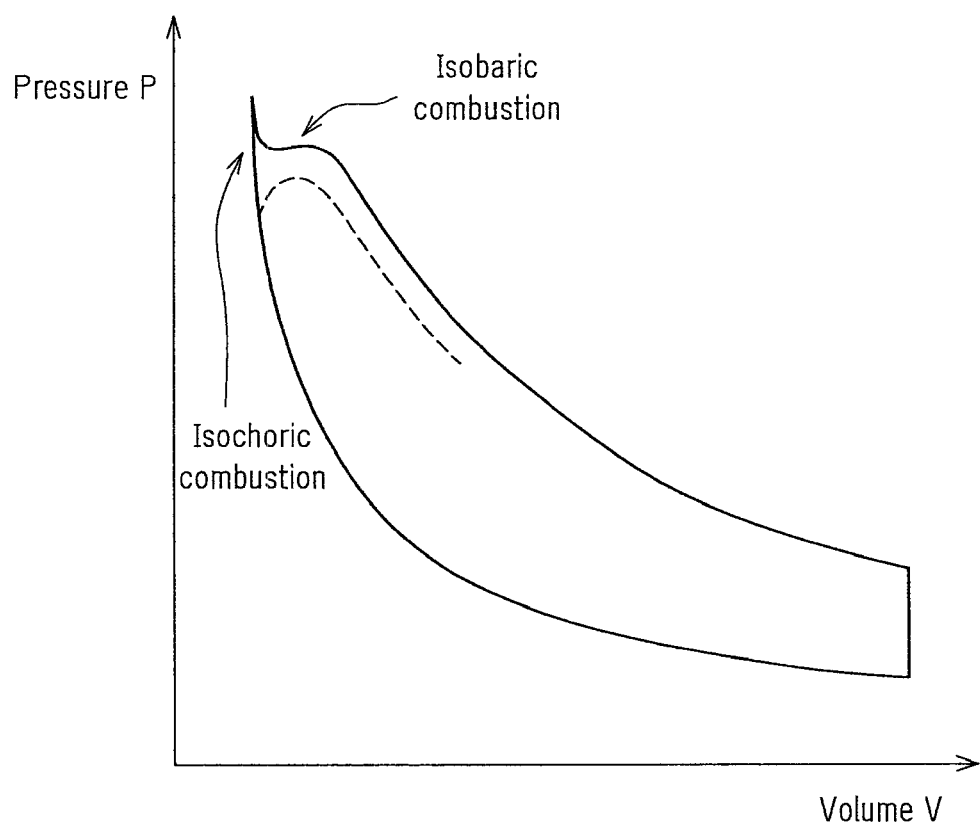
FIG. 7 is a PV diagram of the diesel engine to which the present invention is applied.

As in the present invention, when the auxiliary injection is an early massive single injection (for example, BTDC 40° CA) as shown in FIG. 5, the gravity center of the premixed combustion (the gravity center of the high-temperature oxidation reaction area) can be positioned in the vicinity of BTDC 10° CA. In the vicinity of BTDC 10° CA, the change in volume per crank angle 1° CA is so small that the volume can be regarded as approximately constant. Accordingly, generating a premixed combustion having a combustion gravity center in the vicinity of BTDC 10° CA ensures that such combustion increases the in-cylinder gas pressure. This extends the isochoric combustion area to the high pressure side, as shown in FIG. 7. This results in an isobaric combustion at a high level of pressure. This increases the area on the PV line (area surrounded by heat cycle), that is, increases workload, compared with usual control (the dashed line in FIG. 7).

(Temperature Controlled Combustion)

As described above, the point of time when the in-cylinder gas temperature in the compression process reaches 750K is regarded as a reference, and the auxiliary injection is carried out before the in-cylinder gas temperature reaches 750K. This ensures that as shown in FIG. 5, an oxidation reaction starts when the in-cylinder gas temperature reaches 750K and the premixed combustion completes before TDC is reached. Thus, setting the injection time of the auxiliary injection based on the in-cylinder gas temperature (of 750K) as a reference ensures control of the premixed combustion in a temperature controlled manner in accordance with the transition of the in-cylinder gas temperature in the compression process. This simplifies the fuel injection control and improves the controllability of fuel injection.

In some cases such as when the temperature is low and when the pressure is low, the in-cylinder gas temperature in the compression process may not reach 900K before TDC is reached, which necessitates increasing the amount of the auxiliary injection. Even in such cases, the injection time of the auxiliary injection is unambiguously determined based on the in-cylinder gas temperature (of 750K) as a reference. This facilitates the attempt to improve the controllability of fuel injection. Even when the in-cylinder gas temperature reaches 900K at BTDC, it may be necessary in some cases to increase the fuel injection amount for the auxiliary injection at a request associated with the premixed combustion amount. Even in such cases, the injection time of the auxiliary injection is unambiguously determined based on the in-cylinder gas temperature (of 750K) as a reference. This facilitates the attempt to improve the controllability of fuel injection.

Figure 8:
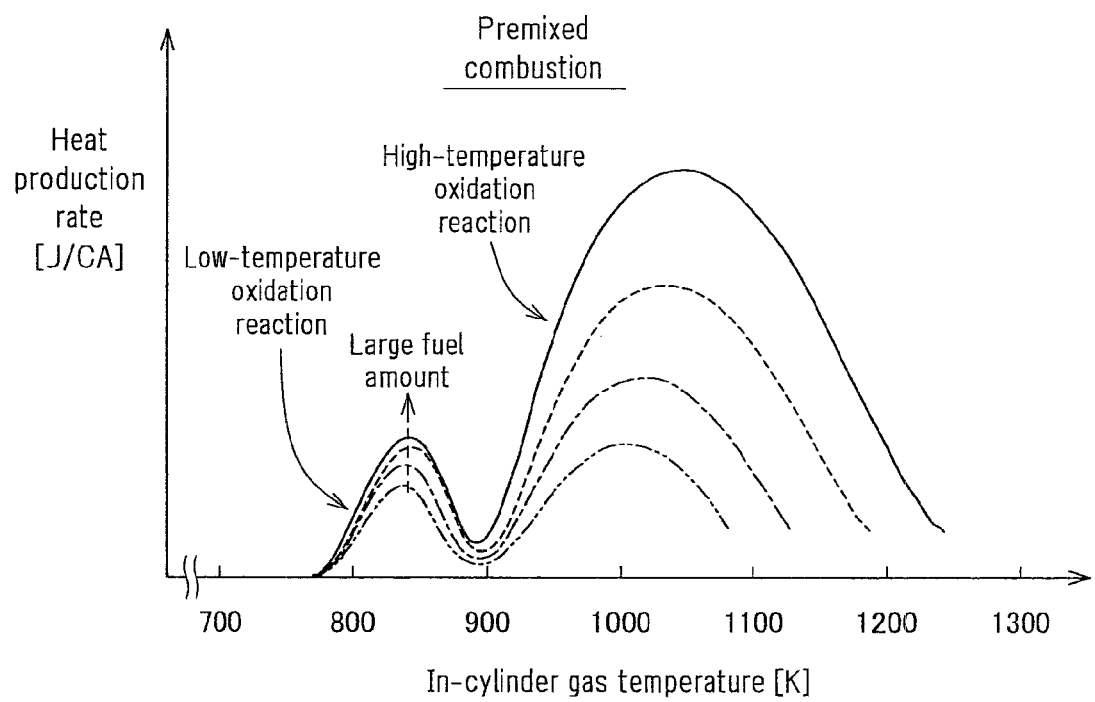
FIG. 8 is a waveform diagram illustrating changes in the heat production rate with the in-cylinder gas temperature as a parameter.

Additionally, controlling the injection time of the auxiliary injection based on the in-cylinder gas temperature (of 750K) as a reference ensures the following, for example. As shown in FIG. 8, even when the fuel injection amount for the auxiliary injection varies, the ignition points of time of the resulting combustions are the same, with aligned phases of combustion gravity center in terms of temperature (the gravity centers of the low-temperature oxidation reactions and the gravity centers of the high-temperature oxidation reactions). This ensures that even when the fuel injection amount for the auxiliary injection is subject to increase or decrease due to transitional changes in the engine operating state, the control is adapted to address the increase or decrease. This, as a result, constantly stabilizes the BTDC premixed combustion.

Fuel Injection Amount of Auxiliary Injection

The fuel injection amount for the auxiliary injection is set according to the premixed combustion amount and the like that are required taking into consideration operating states such as engine revolution, required torque, coolant temperature, and intake air temperature. If the fuel injection amount for the auxiliary injection is in excessive supply, the premixed combustion may not be separated into a low-temperature oxidation reaction and a high-temperature oxidation reaction, creating a possibility of combination of the two combustions. This will be described below.

When the fuel injection amount for the auxiliary injection increases, the amount of the low-temperature oxidation reaction component included in the fuel increases. This increases the period of the low-temperature oxidation reaction. If the period of the low-temperature oxidation reaction increases, the low-temperature oxidation reaction may not end before the temperature reaches the start temperature (900K) for the high-temperature oxidation reaction. This results in the low-temperature oxidation reaction combining with the high-temperature oxidation reaction. This circumstance (the low-temperature oxidation reaction combined with the high-temperature oxidation reaction) significantly prompts the combustion, causing the problem of combustion noise. If the fuel injection amount for the auxiliary injection increases, the high-temperature oxidation reaction component increases, and the density (spray density) increases. This rapidly increases the speed of the high-temperature oxidation reaction and significantly prompts the combustion, likewise causing the problem of combustion noise. In view of this, it is necessary to set an upper limit on the fuel injection amount for the auxiliary injection.

In this embodiment, operating states (engine revolution and required torque) of the engine 1, for example, are used as parameters so as to obtain the upper limit of the fuel injection amount by an experiment, a simulation, or the like in consideration of the above-described combustion noise.

It is noted that in this embodiment, when the required fuel injection amount for the auxiliary injection is small in accordance with the operating states of the engine (for example, when the engine load is small due to a completely warm-up state), the auxiliary injection before 750K is reached is not carried out. That is, if an early injection as described above is carried out (for example, an injection at BTDC 40° CA) when the required fuel injection amount for the auxiliary injection is small, the fuel may be in an excessively decentralized state when the in-cylinder gas temperature reaches 900K. This creates a possibility of generation of unburned HC. In this case, no control is carried out to set the injection time of the auxiliary injection at a time before the in-cylinder gas temperature reaches 900K.

Specific Control Procedure (1)

Referring to FIG. 5, description will be given with regard to one example of a specific control procedure for a fuel injection from the injector 23 in the case of adjusting fuel injection patterns (the injection time and fuel injection amount for the auxiliary injection for the premixed combustion, and the injection time and fuel injection amount for the main injection for the diffusion combustion).

It is noted that the fuel injection control described below (which includes [S11] to [S17]) is repeated at every predetermined crank angle (for each cylinder) in the ECU 100. Specifically, for example, to describe one cylinder, for every combustion process in the cylinder, the fuel injection control is carried out prior to the combustion process.

Prior to the description of the control by the ECU 100, description will be given with regard to a reference crank angle Ainj [° CA], at which the in-cylinder gas temperature reaches 750K.

(Reference Crank Angle Ainj)

An engine 1 in question (for example, a diesel engine having a compression ratio of 15) is subjected to a bench test, a simulation, or the like so as to obtain a motoring temperature waveform and a compression gas temperature estimated waveform as shown in FIG. 5. The compression gas temperature estimated waveform is obtained by addition (offset) of heat accumulated through load operations. Based on the obtained compression gas temperature estimated waveform, a crank angle [° CA] at which the in-cylinder gas temperature (compression gas temperature) reaches 750K is calculated. The obtained crank angle corresponding to 750K is assumed a reference (reference crank angle Ainj) to control the auxiliary injection in a temperature controlled manner. By this process, the reference crank angle Ainj is obtained for each operating state (for example, for each lattice point of an operating state map with the engine revolution and the required torque as parameters) and mapped. The map of reference crank angles Ainj is stored in the ROM 102 of the ECU 100.

(Fuel Injection Control)

This example, described below, is a case of making the premixed combustion by the auxiliary injection slow while satisfying a required NOx amount required for the engine 1. It is noted that this example shows fuel injection control in the case where the in-cylinder gas temperature reaches 900K in the compression process due to gas compression before the compression top dead center is reached.

[S11] Based on operating states such as engine revolution, accelerator operation amount, coolant temperature, and intake air temperature, and based on environmental conditions and other conditions, a total fuel injection amount ([fuel injection amount of auxiliary injection]+[fuel injection amount of main injection]) is obtained by referring to a known map and the like.

[S12] A delay angle value of the injection time (injection start time) of the main injection relative to TDC is determined by referring to a map based on the required NOx amount [g/h] required for the engine 1.

The delay angle map is a map with the required NOx amount as a parameter and used to set a delay angle value of the injection time of the main injection relative to TDC. The delay angle map is produced in advance by an experiment, a simulation, or the like, and stored in, for example, the ROM 102 of the ECU 100. The delay angle map is set such that as the required NOx amount decreases, the delay angle value of the injection time (injection start time) of the main injection increases. However, if the delay angle of the diffusion combustion by the auxiliary injection for the diffusion combustion is excessively large, an accidental fire may occur. In order to prevent this, an upper limit is set on the delay angle side of the main injection.

It is noted that to prevent an accidental fire, the delay angle of the main injection may be restricted using a delay angle guard value. The delay angle guard value is an injection time at which the combustion gravity center of the diffusion combustion by the main injection reaches, for example, ATDC 20° CA. When priority is placed on combustion efficiency, the delay angle of the main injection may be restricted using such a delay angle guard value that the injection time is when the combustion gravity center of the fuel by the main injection reaches, for example, ATDC 15° CA.

[S13] Based on the delay angle value of the injection time of the main injection, which is determined in the process of [S12], a fuel amount is obtained from a map. The fuel amount is an amount that enables a combustion by a diffusion injection according to the fuel injection at the delay angle value (that is, the fuel amount is the upper limit of fuel amount under which no smoke occurs in the delay angle diffusion combustion). The upper limit of fuel amount is assumed the fuel injection amount for the main injection.

It is noted that the fuel injection amount for the main injection is a fuel amount with priority placed on emission reduction, as described above, and is smaller than a fuel amount for a fuel injection with priority placed on performance (priority placed on engine torque or the like). It should be noted, however, that the fuel injection amount satisfactorily meets the required torque.

Next, based on the fuel injection amount for the main injection and on injection characteristics (such as injection amount per unit time) of the injector 23, the injection period of the main injection (injection start time to injection end time) is calculated. Subsequently, based on the fuel period of the main injection and the injection time of the main injection (injection start time), the injection end time of the main injection shown in FIG. 5 is determined.

The upper limit fuel amount map used in the process of [S13] uses, as a parameter, the delay angle value of the injection time of the main injection relative to TDC. With this parameter, upper limits of fuel amounts under which no smoke occurs in the diffusion combustion (fuel amounts that enable combustions in the delay angle diffusion combustion) are obtained in advance by an experiment, a simulation, or the like. Based on the results, values adapted to the parameter (as the upper limits of fuel amounts) are plotted on the map. The map is stored in, for example, the ROM 102 of the ECU 100. In the upper limit fuel amount map, as the delay angle value of the injection time of the main injection increases, the upper limit of fuel amount for the diffusion combustion decreases.

[S14] The fuel injection amount for the auxiliary injection ([fuel injection amount of auxiliary injection]=[total fuel injection amount]−[fuel injection amount of main injection]) is calculated using the total fuel injection amount obtained in the process of [S11] and the fuel injection amount for the main injection determined in the process of [S13]. Next, a determination is made as to whether the calculated fuel injection amount for the auxiliary injection is larger than the above-described upper limit (an upper limit in consideration of combustion noise in the premixed combustion). When the fuel injection amount for the auxiliary injection is equal to or smaller than the upper limit, the value calculated in the above-described process remains unchanged and is assumed the fuel injection amount for the auxiliary injection. In contrast, when the fuel injection amount for the auxiliary injection calculated in the above-described process is larger than the upper limit, the amount of the extra fuel (surplus fuel amount) beyond the upper limit is injected at the after-injection, which is after the main injection, so as to ensure a generated torque.

The fuel injection amount for the auxiliary injection calculated in the process of [S14] ([total fuel injection amount]−[fuel injection amount of main injection]) is a fuel amount that satisfactorily meets the fuel injection amount required for securing the premixed combustion amount, and is a fuel amount that enables the early massive single injection.

[S15] The reference crank angle Ainj (which is the crank angle at which the in-cylinder gas temperature reaches 750K) is obtained by referring to a map based on current operating states (for example, the engine revolution and the required torque). The injection end time of the auxiliary injection shown in FIG. 5 is determined using the reference crank angle Ainj.

Specifically, based on the fuel injection amount for the auxiliary injection obtained in the process of [S14], the injection end time of the auxiliary injection is set at a time that is advanced relative to the reference crank angle Ainj (750K) by a predetermined amount $\alpha$ (for example, $\alpha=5°$ CA), so as to ensure that the spray corresponding to the fuel injection amount for the auxiliary injection is vaporized before the reference crank angle Ainj is reached ([injection end time of auxiliary injection]=[Ainj−$\alpha$]).

[S16] Based on the fuel injection amount for the auxiliary injection obtained in the process of [S14] and on injection characteristics of the injector 23 (such as injection amount per unit time), the injection period of the auxiliary injection (injection start time to injection end time) is calculated. Then, the injection start time of the auxiliary injection shown in FIG. 5 is determined based on the injection period of the auxiliary injection and on the injection end time determined in the process of [S15] ([injection start time of auxiliary injection]=[injection end time of auxiliary injection]−[injection period of auxiliary injection]).

In this respect, a determination is made as to whether the injection start time of the auxiliary injection (calculation value) is on the delay angle side or on the advance angle side relative to an advance angle guard value described below. When the injection start time of the auxiliary injection is on the delay angle side relative to the advance angle guard value, the injection start time and the injection end time of the auxiliary injection calculated in the above-described processes remain unchanged and are used to determine fuel injection patterns (fuel injection form) shown in FIG. 5. It is noted that when the injection period of the auxiliary injection (calculated value) is on the delay angle side relative to the advance angle guard value, the injection period of the auxiliary injection may be advanced to the advance angle guard value in order to improve the slowness of the premixed combustion by the auxiliary injection.

In contrast, when the injection start time of the auxiliary injection (calculation value) is on the advance angle side relative to the advance angle guard value, the injection period of the auxiliary injection is restricted to the advance angle guard value. In this respect, when the fuel injection amount for the auxiliary injection needs to be corrected and reduced, the amount of correction and reduction (surplus fuel amount) of the auxiliary injection is injected at the after-injection, which is after the main injection, so as to ensure a generated torque.

Figure 9:
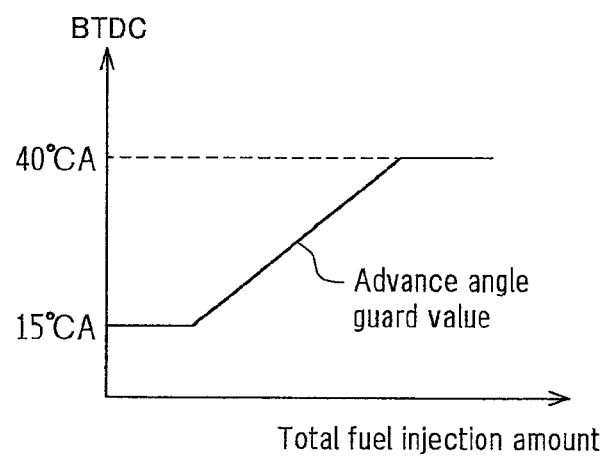
FIG. 9 is a diagram illustrating a setting map of advance angle guard values for an auxiliary injection.

The advance angle guard value is obtained by referring to the map of FIG. 9 based on the total fuel injection amount for the auxiliary injection. The map of FIG. 9 uses the total fuel injection amount for the auxiliary injection as a parameter. With this parameter, the map plots advance angle guard values adapted to the parameter empirically through an experiment, a simulation, or the like in advance in consideration of the amount of generated unburned HC and. The map is stored in, for example, the ROM 102 of the ECU 100.

[S17] The fuel injection from the injector 23 is carried out based on the fuel injection patterns (injection start time and injection end time of auxiliary injection, and injection start time and injection end time of main injection) determined in the manner described above. This fuel injection control ensures the combustion represented by the heat production rate waveform shown in FIG. 5, that is, a combustion in which the combustion gravity center of the premixed combustion is separated from the combustion gravity center of the diffusion combustion, and in which the premixed combustion is separated into the low-temperature oxidation reaction and the high-temperature oxidation reaction.

As has been described hereinbefore, in this example, the in-cylinder gas temperature (of 750K) is assumed a reference, and the auxiliary injection is carried out before the in-cylinder gas temperature reaches 750K, so as to effect an oxidation reaction at the point of time when the in-cylinder gas temperature reaches 750K. This ensures that the premixed combustion ends before the compression top dead center is reached, and that the premixed combustion before the compression top dead center is controlled in a temperature controlled manner in accordance with the transition of the in-cylinder gas temperature in the compression process. This simplifies the fuel injection control and improves the controllability of fuel injection.

Further in this example, the premixed combustion by the auxiliary injection is separated into a low-temperature oxidation reaction and a high-temperature oxidation reaction. This ensures a slow premixed combustion before the compression top dead center is reached. This extends the premixed combustion period before the diffusion combustion, and ensures a sufficient preheating amount and a sufficient premixed combustion amount. This, as a result, stabilizes the ignition time of the diffusion combustion by the main injection, and achieves combustions of high robustibility. Additionally, making the auxiliary injection an early injection (for example, BTDC 40° CA) ensures a wide range of fuel injection, over a wide space, and ensures generation of a combustion field of a high oxygen concentration. This realizes combustions with suppressed amounts of NOx generation and smoke generation. Additionally, the premixed combustion is separated into a low-temperature oxidation reaction and a high-temperature oxidation reaction, so as to make the premixed combustion a slow combustion. This suppresses the amount of NOx generation, the amount of smoke generation, and combustion noise in the premixed combustion. Further, with the premixed combustion before the compression top dead center made slow, a loss (negative workload) in the compression process decreases.

While in the example shown in FIG. 5 the injection start time of the main combustion is delayed relative to TDC, this should not be construed in a limiting sense. The injection start time of the main combustion may be in the vicinity of TDC.

Specific Control Procedure (2)

Figure 10:
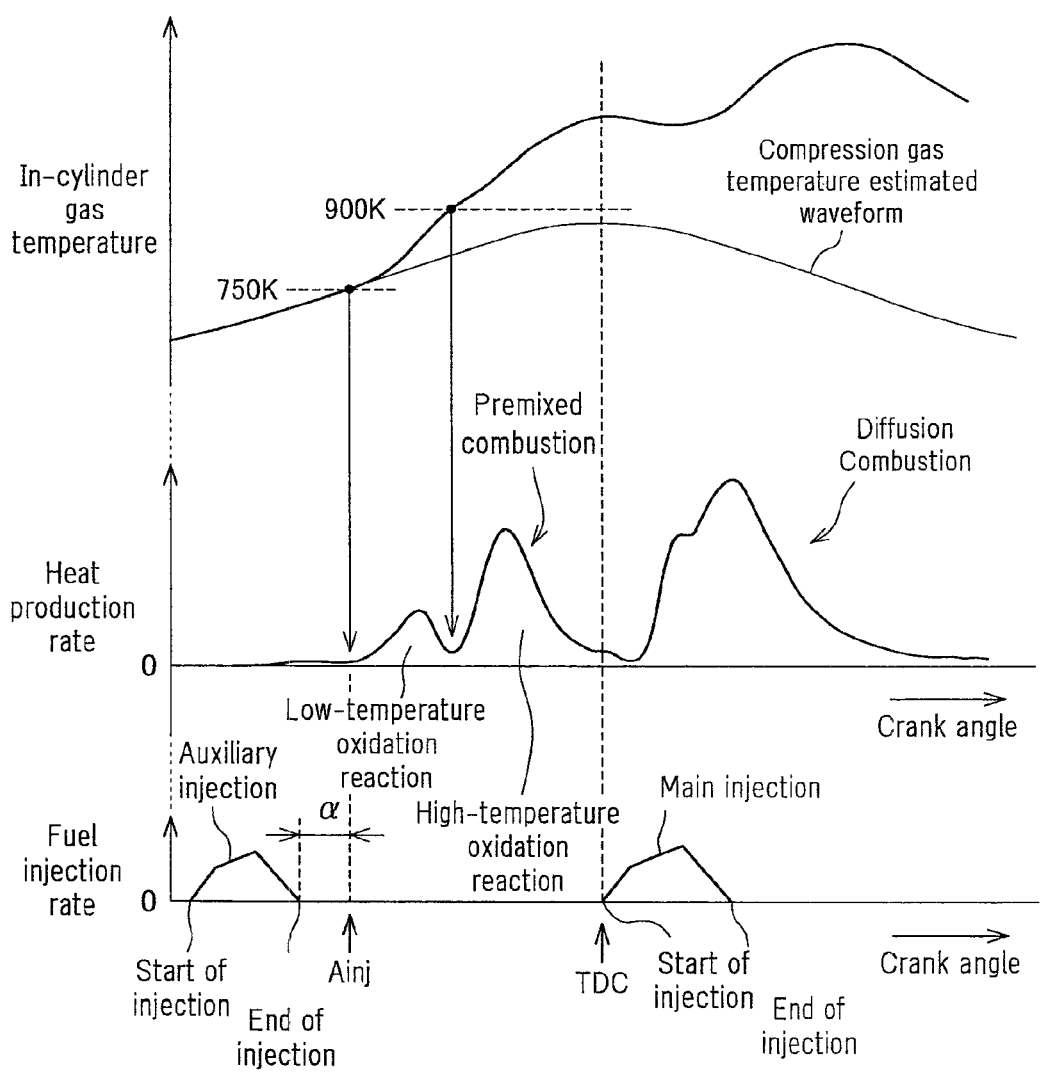
FIG. 10 is waveform diagrams illustrating other exemplary changes in the heat production rate (heat production amount per unit rotation angle of a crankshaft) in the compression and expansion processes, exemplary changes in the fuel injection rate (fuel injection amount per unit rotation angle of the crankshaft), and exemplary changes in the in-cylinder gas temperature.

Referring to FIG. 10, description will be given with regard to another example of a specific control procedure for a fuel injection from the injector 23 in the case of adjusting fuel injection patterns.

In this example, the present invention is applied to fuel injection control in such engine operating states as when the temperature is low and when the pressure is low, in which case the in-cylinder gas temperature does not reach 900K only by gas compression in the compression process before the compression top dead center is reached.

As described above, when the in-cylinder gas temperature does not reach 900K in the compression process before the compression top dead center is reached, the required fuel injection amount for the auxiliary injection is increased so as to reliably obtain an ignition. However, the injection time of the auxiliary injection is not systematically specified and determined by trial and error. In order to address this issue, a feature of this example shown in FIG. 10 is to effect the auxiliary injection before the in-cylinder gas temperature reaches 750K so as to control the premixed combustion in a temperature controlled manner in accordance with the transition of the in-cylinder gas temperature in the compression process. A specific example of the control will be described below.

It is noted that this example of control is similar to [Specific Control Procedure (1)] in that an engine 1 in question (for example, a diesel engine having a compression ratio of 15) is subjected to a bench test, a simulation, or the like so as to obtain a compression gas temperature estimated waveform. Based on the obtained compression gas temperature estimated waveform, a crank angle [° CA] at which the in-cylinder gas temperature (compression gas temperature) reaches 750K is calculated. The obtained crank angle corresponding to 750K is assumed a reference (reference crank angle Ainj) to control the auxiliary injection in a temperature controlled manner. By this process, the reference crank angle Ainj is obtained for each operating state (for example, for each lattice point of an operating state map with the engine revolution and the required torque as parameters) and mapped. The map of reference crank angles Ainj is stored in the ROM 102 of the ECU 100.

(Fuel Injection Control)

In this example, the fuel injection control described below (which includes [S21] to [S25]) is repeated at every predetermined crank angle (for each cylinder) in the ECU 100. Specifically, for example, to describe one cylinder, for every combustion process in the cylinder, the fuel injection control is carried out prior to the combustion process.

[S21] Based on operating states such as engine revolution, accelerator operation amount, coolant temperature, and intake air temperature, and based on environmental conditions and other conditions, the fuel injection amount for the main injection and the fuel injection amount for the auxiliary injection are obtained by referring to a known map and the like. Further, a total fuel injection amount ([fuel injection amount of auxiliary injection]+[fuel injection amount of main injection]) is obtained. In this respect, this example is concerned with such engine operating states as when the temperature is low and when the pressure is low. Hence, even when the engine revolution and the load are the same as those in normal operation (such as in completely warm-up state), the required fuel injection amount for the auxiliary injection is larger than the one in normal operation, resulting in a larger total fuel injection amount.

[S22] The injection start time of the main injection is set at TDC. Then, the injection period of the main injection (injection start time to injection end time) is calculated based on the fuel injection amount for the main injection obtained in the process of [S21] and injection characteristics of the injector 23 (such as injection amount per unit time). Subsequently, based on the fuel period of the main injection and the injection start time of the main injection (TDC), the injection end time of the main injection ([injection end time]=[TDC]+[injection period]) as shown in FIG. 10 is determined.

It is noted that the injection start time of the main combustion may be delayed relative to TDC by a predetermined amount. The injection start time of the main combustion may be determined in accordance with the current engine operating state (required torque) by referring to, for example, a map with engine operating states (engine revolution and required torque) as parameters.

[S23] The reference crank angle Ainj (which is the crank angle at which the in-cylinder gas temperature reaches 750K) is obtained by referring to a map based on current operating states (for example, the engine revolution and the required torque). The injection end time of the auxiliary injection shown in FIG. 10 is determined using the reference crank angle Ainj.

Specifically, based on the fuel injection amount for the auxiliary injection obtained in the process of [S14], the injection end time of the auxiliary injection is set at a time that is advanced relative to the reference crank angle Ainj (750K) by a predetermined amount $\alpha$ (for example, $\alpha=5°$ CA), so as to ensure that the spray corresponding to the fuel injection amount for the auxiliary injection is vaporized before the reference crank angle Ainj is reached ([injection end time of auxiliary injection]=[Ainj−$\alpha$]).

[S24] Based on the fuel injection amount for the auxiliary injection obtained in the process of [S21] and on injection characteristics of the injector 23 (such as injection amount per unit time), the injection period of the auxiliary injection (injection start time to injection end time) is calculated. Then, the injection start time of the auxiliary injection shown in FIG. 10 is determined based on the injection period of the auxiliary injection and on the injection end time determined in the process of [S23] ([injection start time of auxiliary injection]=[injection end time of auxiliary injection]−[injection period of auxiliary injection]).

In this respect, a determination is made as to whether the injection start time of the auxiliary injection (calculation value) is on the delay angle side or on the advance angle side relative to an advance angle guard value described below. When the injection start time of the auxiliary injection is on the delay angle side relative to the advance angle guard value, the injection start time and the injection end time of the auxiliary injection calculated in the above-described processes remain unchanged and are used to determine fuel injection patterns (fuel injection form) shown in FIG. 10. It is noted that when the injection period of the auxiliary injection (calculated value) is on the delay angle side relative to the advance angle guard value, the injection period of the auxiliary injection may be advanced to the advance angle guard value in order to improve the slowness of the premixed combustion by the auxiliary injection.

In contrast, when the injection start time of the auxiliary injection (calculation value) is on the advance angle side relative to the advance angle guard value, the injection period of the auxiliary injection is restricted to the advance angle guard value. In this respect, when the fuel injection amount for the auxiliary injection needs to be corrected and reduced, the amount of correction and reduction (surplus fuel amount) of the auxiliary injection is injected at the after-injection, which is after the main injection, so as to ensure a generated torque.

Also in this example, the advance angle guard value is obtained by referring to the map of FIG. 9 based on the total fuel injection amount for the auxiliary injection. The map of FIG. 9 uses the total fuel injection amount for the auxiliary injection as a parameter. With this parameter, the map plots advance angle guard values adapted to the parameter empirically through an experiment, a simulation, or the like in advance in consideration of the amount of generated unburned HC and. The map is stored in, for example, the ROM 102 of the ECU 100.

[S25] The fuel injection from the injector 23 is carried out based on the fuel injection patterns (injection start time and injection end time of auxiliary injection, and injection start time and injection end time of main injection) determined in the manner described above. This fuel injection control ensures the combustion represented by the heat production rate waveform shown in FIG. 10, that is, a combustion in which the combustion gravity center of the premixed combustion is separated from the combustion gravity center of the diffusion combustion, and in which the premixed combustion is separated into the low-temperature oxidation reaction and the high-temperature oxidation reaction.

As has been described hereinbefore, also in this example, the in-cylinder gas temperature (of 750K) is assumed a reference, and the auxiliary injection is carried out before the in-cylinder gas temperature reaches 750K, so as to effect an oxidation reaction at the point of time when the in-cylinder gas temperature reaches 750K. This ensures that the premixed combustion ends before the compression top dead center is reached, and that the premixed combustion before the compression top dead center is controlled in a temperature controlled manner in accordance with the transition of the in-cylinder gas temperature in the compression process. This simplifies the fuel injection control and improves the controllability of fuel injection.

Further, making the premixed combustion slow extends the premixed combustion period before the diffusion combustion, and ensures a sufficient preheating amount and a sufficient premixed combustion amount. This, as a result, stabilizes the ignition time of the diffusion combustion by the main injection, and achieves combustions of high robustibility. Additionally, making the auxiliary injection an early injection (for example, BTDC 40° CA) ensures a wide range of fuel injection, over a wide space, and ensures generation of a combustion field of a high oxygen concentration. This realizes combustions with suppressed amounts of NOx generation and smoke generation. Additionally, the premixed combustion is separated into a low-temperature oxidation reaction and a high-temperature oxidation reaction, so as to make the premixed combustion a slow combustion. This suppresses the amount of NOx generation, the amount of smoke generation, and combustion noise in the premixed combustion. Further, with the premixed combustion before the compression top dead center made slow, a loss (negative workload) in the compression process decreases.

Other Embodiments

In the above examples, the combustion by the auxiliary injection is controlled in a temperature controlled manner using, as a reference, the reference crank angle Ainj (the crank angle at which the in-cylinder gas temperature reaches 750K), which is obtained in advance by a bench test, a simulation, or the like. This, however, should not be construed in a limiting sense. Another method may be applied.

For example, the in-cylinder gas temperature may be detected or estimated during an engine operation so as to obtain a reference crank angle Ainj at which the in-cylinder gas temperature reaches 750K. With the reference crank angle Ainj as a reference, the combustion by the auxiliary injection may be controlled in a temperature controlled manner. In this case, it is possible to employ as the intake air temperature an intake temperature obtained from an output signal of the intake temperature sensor 49 during closing of the intake valve 16, or it is possible to estimate the in-cylinder gas temperature using a map or a formula for estimating the in-cylinder gas temperature based on the ambient temperature, engine operating states, and the like.

In the above examples, the present invention is applied to a common rail in-cylinder direct injection multi-cylinder (in-line four-cylinder) diesel engine. This should not be construed as limiting the present invention. The present invention may also be applied to diesel engines with any other number of cylinders, for example, a 6-cylinder diesel engine. Also, automobile engines should not be construed as limiting the present invention.

In the above examples, the piezo injector 23 employed in the engine 1 turns into a fully open state only during a conduction period so as to change the fuel injection rate. The present invention may also be applied to engines employing variable injection rate injectors.

In the above example, the maniveter 77 includes the NSR catalyst 75 and the DPNR catalyst 76. The maniverter 77 may also include the NSR catalyst 75 and a DPF (Diesel Particulate Filter).

Industrial Applicability

The present invention finds applications in fuel injection control apparatuses of internal combustion engines typified by diesel engines. More particularly, the present invention is effectively applicable to a fuel internal injection apparatus of a compression self-igniting combustion engine capable of a main injection to cause a combustion that mainly includes a diffusion combustion and capable of an auxiliary injection executed prior to the main injection and causing a combustion that mainly includes a premixed combustion.

DESCRIPTION OF THE REFERENCE NUMERAL

1 Engine (internal combustion engine)
2 Fuel supply system
3 Combustion chamber (cylinder)
21 Supply pump
23 Injector (fuel injection valve)
40 Crank position sensor
46 Water temperature sensor
47 Accelerator opening degree sensor
49 Intake temperature sensor
100 ECU

The invention claimed is:

1. A fuel injection control apparatus applicable to control of a compression self-igniting internal combustion engine in which fuel injected into a cylinder from a fuel injection valve combusts in the cylinder, the fuel injection control apparatus being configured to carry out an operation of fuel injection from the fuel injection valve into the cylinder, the operation of fuel injection comprising at least a main injection and an auxiliary injection, the main injection causing a combustion mainly comprising a diffusion combustion in the cylinder, the auxiliary injection being carried out prior to the main injection and causing a combustion mainly comprising a premixed combustion in the cylinder, wherein a fuel injection by the auxiliary injection ends before a gas temperature inside the cylinder reaches a temperature at which a fuel starts a low-temperature oxidation reaction.

2. The fuel injection control apparatus of the internal combustion engine according to claim 1, wherein the temperature at which the fuel starts the low-temperature oxidation reaction is 750K, and the fuel injection by the auxiliary injection ends before the in-cylinder gas temperature reaches 750K.

3. The fuel injection control apparatus of the internal combustion engine according to claim 2, wherein the injection time of the auxiliary injection is set so that a spray of fuel injected at the auxiliary injection vaporizes before the in-cylinder gas temperature reaches 750K.

4. The fuel injection control apparatus of the internal combustion engine according to claim 1, wherein the injection time of the auxiliary injection is restricted by an advance angle guard value.

5. The fuel injection control apparatus of the internal combustion engine according to claim 4, wherein the advance angle guard value for the injection time of the auxiliary injection is set in consideration of an amount of generation of an unburned hydrocarbon.

* * * * *